Aug. 23, 1938.   J. D. RYDER   2,127,845
MEASURING APPARATUS
Filed March 25, 1933
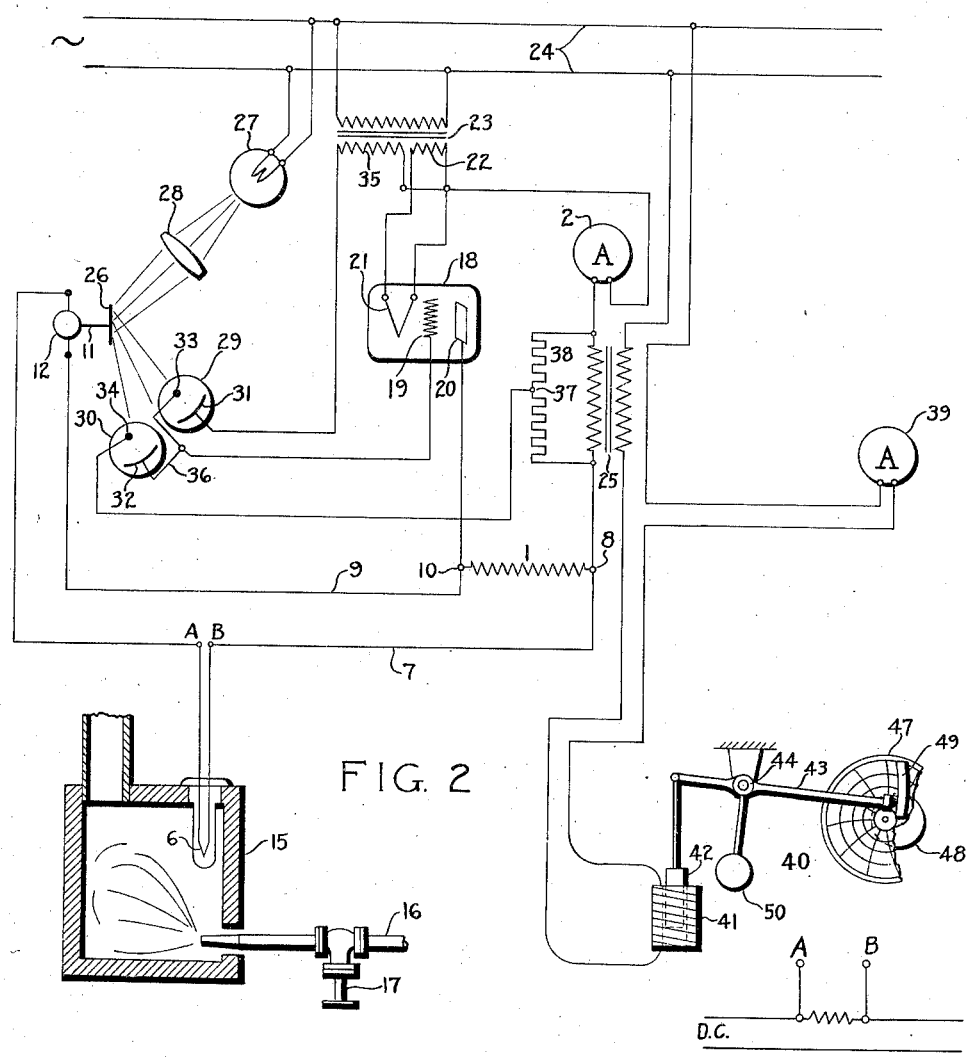
INVENTOR
John D. Ryder
BY
Raymond W. Junkins
ATTORNEY Patented Aug. 23, 1938

2,127,845

UNITED STATES PATENT OFFICE 2,127,845

MEASURING APPARATUS

John D. Ryder, Cleveland, Ohio, assignor to Bailey Meter Company, a corporation of Delaware Application March 25, 1933, Serial No. 662,848

14 Claims. (Cl. 175—183)

This invention relates to measuring apparatus which is readily adapted to determine the magnitude of any physical, electrical, thermal, chemical or other variable condition, quantity, or quality, such for example as fluid rate of flow, temperature, pressure, electrical current, etc.

In accordance with my invention, I cause to be produced an electrical effect proportional in magnitude to the magnitude of the condition or variable to be measured and then by a suitable measuring circuit, forming a part of my improved measuring apparatus, I determine the magnitude of the electrical effect, or obtain a measurement representative of such magnitude.

A primary object of my invention is to provide a measuring apparatus capable of exhibiting variations in, or the actual value of, the magnitude of a condition or variable substantially instantaneously with the occurrence of such variations and so that an observer will be advised of the magnitude of the condition at any time existing, and not of the magnitude which existed at some time previously, except insofar as such condition might be recorded for permanent record. In other words, to avoid a time delay between the occurrence of a change in magnitude and the presentation of such change for observation upon a measuring instrument which is now the usual practice in many types of measurement.

Another object of the invention is to provide measuring apparatus wherein no appreciable work is required of the galvanometer, milli-voltmeter, milli-ammeter or other instrument deflecting in accordance with variations in the electrical effect indicative of changes in the magnitude of the condition, so that a high order of accuracy is obtained.

A further object of the invention is to provide improved measuring apparatus wherein the power present in small electrical effects, such as generated by a thermocouple, may be amplified to any desired value so that ample power is available for the operation of indicating, recording, or other types of measuring devices. At present it is only possible to indicate very minute electrical voltages or currents as they have not inherently sufficient power to actuate recording devices, and it is to overcome such difficulties that I propose my improved arrangement wherein the power of minute electrical effects is sufficiently amplified in simple and novel manner to provide power necessary for recording or other measuring instruments.

A still further object is to provide apparatus of this type wherein a value to be measured is continuously recorded in contradistinction to measuring apparatus at present in commercial usage, which is of the periodically actuated or step-by-step type wherein the value of the variable or condition is indicated or recorded only periodically and not continuously. Such improvement predicates the substantially instantaneous advising of the value of variables as compared to the introduction of a time delay in waiting for periodic mechanisms to be actuated.

My invention has for a further object the provision of measuring apparatus which is affected only by changes in the magnitude of the condition to be measured, and wherein such apparatus is affected in substantially no degree by varying ambient conditions, such as pressure, or temperature, or variations in the resistance, available potential, or other electrical properties of the electric circuit employed.

An improved arrangement of my invention provides measuring apparatus wherein the basic range of the advising instrument may be readily changed.

The invention is characterized by measuring apparatus of the null or balanced type, wherein an electrical effect bearing a functional relation to the magnitude of a condition is caused to exert a force proportional to its magnitude, which force is balanced against a predetermined known force and one or the other of the forces varied until they stand at equal or predetermined ratio to each other, and whereafter the sensitive device, such as a galvanometer, is in a neutral or balanced position.

Such arrangement relates to apparatus of a character referred to wherein the condition to be measured may be caused to produce a potential such, for example, as is produced by means of a thermocouple sensitive to varying temperature and wherein a potential is produced in equal magnitude but opposed thereto by varying the current in an impedance of constant magnitude; whereby the current is a measure of the magnitude of the condition.

An important advantage of my improved measuring apparatus over that now known is that the current through an impedance of constant magnitude may be automatically varied for re-balancing the system without the transformation of electrical energy to mechanical energy, or vice versa. In other words, the opposing force is varied electrically and the balance is automatically electrical by nature with no intermediate mechanical step such as is now common practice in known torque amplifying devices and arrangements.

In the drawing:

Fig. 1 is a diagrammatic illustration of one elementary circuit or form of my invention.

Fig. 2 is a diagrammatic illustration of a modification of the invention employing the elemental circuit of Fig. 1.

Fig. 3 shows an alternate circuit arrangement which may be utilized as replacement in either Fig. 1 or Fig. 2.

Figs. 4 and 5 illustrate modifications of a portion of Figs. 1 and 2.

Basically, considering the elemental circuit shown in Fig. 1, I provide a galvanometer circuit wherein a sensitive element, such as the galvanometer mentioned, moves responsive to the value of a variable condition to be measured. In connection therewith, I provide a measuring circuit of the variable at amplified power. Further than this, I have an impedance common to the two circuits, namely, to the galvanometer circuit and to the measuring circuit and which impedance in general constitutes a fixed resistance through which is applied a varying or varied current. The impedance may be varied by either of the mentioned circuits in which it is common, and the arrangement is such that if it is so varied by one of the circuits, the system comes to a balance or null condition by change in the other or both circuits.

It is, of course, to be understood that the drawing and specification relating thereto serve to illustrate and describe preferred embodiments of my invention and are not to be considered as limitations. My improved measuring apparatus is of a broad nature, to be arranged and utilized in numerous ways, of which I have illustrated and will describe certain preferred embodiments.

As illustrated in Fig. 1, the invention contemplates determining the potential produced by a thermocouple, and consequently the temperature to which the thermocouple is subjected, by opposing such thermocouple potential with a potential maintained at equal magnitude thereto and generated by a variable current in an impedance of constant magnitude; whereby the current necessary to produce the last-named potential becomes a measure of the thermocouple potential.

I illustrate at 1 a suitable impedance of constant magnitude, such as a fixed resistance. Such impedance is common in two loop circuits, one of which I designate as the galvanometer circuit and the other as the measuring circuit. In the measuring circuit, in addition to the impedance 1, I show a current measuring device, such as an ammeter 2, the source of potential 3, and a slide wire resistance 4, which may be readily varied in effectiveness in the circuit by means of the manually adjustable control or contact arm 5 adapted to frictionally engage the slide wire resistance 4 in common manner. The contact arm 5 will be effective for varying the current in the measuring circuit in accordance with Ohm's law that the electromotive force is equal to the current multiplied by the impedance. It is readily observed, therefore, that the adjustable contact arm 5 provides a means for varying the potential difference across the resistance 1 at will, and as this potential difference will vary directly with the current in the circuit, the deflection of the ammeter, or other measuring device 2, will be proportional to the potential difference across the resistance 1.

I show the galvanometer circuit, in which the resistance 1 is also a part, as having a thermocouple 6 connected by a conductor 7 with the resistance 1 at a point 8, and by a second conductor 9 with the resistance 1 at the other end 10. The polarity of the thermocouple potential is arranged to oppose that produced by the current in the resistance 1, so that a movable needle 11 of a galvanometer 12, connected in the conductor 9 of the galvanometer circuit, will deflect from its mid or neutral position in accordance with the difference between the potential generated by the thermocouple and that potential produced by the current in the resistance 1. In order that differences in the magnitude of the potentials may be readily observed, I have arranged to cooperate with the movable member 11 of the galvanometer, a scale 13 having a suitable reference line 14 which lies preferably directly in line with the movable member 11 when it is in its mid or neutral position as shown.

An observer would observe the movable needle 11 of the galvanometer for movement from coincidence with the line 14, indicating that the potential of the thermocouple 6 had changed and, consequently, the temperature to which the thermocouple is sensitive. If such movement of the needle 11 had occurred, he would restore it to its balanced position by proper manipulation of the contact arm 5 along the slide wire resistance 4; movement of the contact arm being effective for varying the resistance of the measuring circuit and consequently varying the current in the resistance 1 to cause a re-balance of the galvanometer in the galvanometer circuit. By maintaining the movable member of the galvanometer at all times in the mid or neutral position, the current in the resistance 1 from the measuring circuit will be a measure of, or proportional to, the thermocouple potential and to the temperature to which the thermocouple is subjected. It therefore follows that the deflection of the indicating element of the current measuring device 2 will be in proportion to changes in temperature to which the thermocouple is sensitive, and will, in cooperation with a suitable scale, indicate and/or record the temperature at the thermocouple.

It is apparent that by my measuring apparatus as illustrated in the elemental circuit diagram of Fig. 1, I have provided a means for amplifying manyfold the power available for operating such a measuring device as that illustrated at 2. The power available directly by the thermocouple 6, as is well known, at best is of a minute magnitude, whereas by proper design of the resistance 1, I may make available for operation of the measuring device 2 a relatively high magnitude of current, on which the power for operating such a current measuring device depends. Therefore, my device or arrangement of apparatus is intrinsically one of a high order of accuracy. It is to be further observed that the apparatus I have illustrated employs the null or balance method in that when the movable member 11 of the galvanometer 12 is in a mid or neutral position, the thermocouple potential is exactly equal to or balanced by the potential difference across the resistance 1, so that substantially no current flows through the thermocouple leads. My measuring apparatus is, therefore, unaffected by variations in the resistance of the thermocouple leads, variations in the potential generated by the source 3, or variations in the resistance of the measuring circuit.

Referring now to Fig. 2, I have illustrated therein a more complete showing of my measuring apparatus wherein in connection with the elemental circuit of Fig. 1, I provide means for automatically varying the current in the measuring circuit to maintain the potential difference across the resistance 1 at all times substantially equal to the potential generated by the thermocouple. Thus, the galvanometer 12 is at all times in balanced condition, or if it departs therefrom due to variations in the temperature to which the thermocouple is sensitive, it is immediately returned to balanced condition by the automatic means to be described. Correspondingly, the value of the current in the measuring circuit is continuously representative of the value of the temperature to which the thermocouple 6 is sensitive, or to departures of said temperature from a predetermined standard.

I show in Fig. 2 the thermocouple 6 exposed to, and sensitive to, the temperature in a furnace 15 and adapted to produce a potential proportional thereto. The furnace is supplied with fuel through a supply line 16, in which a valve 17 is positioned in any desired manner to control the rate of supply of fuel to the furnace and, consequently, the temperature to which the thermocouple 6 is sensitive. The resistance 1 forms in the measuring circuit a part of the output circuit of a suitable electronic discharge device shown as a thermionic valve 18, having a control grid 19, an anode 20, and a cathode 21, which latter is provided with suitable heating current by the secondary 22 of a transformer 23, the primary of which is connected across an alternating current power line 24. Also connected in the output circuit is the current measuring device 2 and the secondary of a transformer 25, which latter provides a source of current for producing a potential difference across the resistance 1 by inductively coupling the output circuit of the electronic discharge device to the alternating current power supply 24.

As is well known, an electron discharge device, such as the thermionic valve which I have indicated at 18, may be rendered more or less conducting to the passage of current by controlling the potential relation between its grid and cathode. Usually when the means provided, generally called the input circuit for energizing the grid, impresses on the grid a potential negative by a predetermined amount with respect to the potential of the cathode, the device is rendered nonconducting and the conductivity is increased in direct proportion as the potential of the grid becomes greater with respect to that of the cathode, until the grid potential is positive some predetermined amount with respect to the cathode potential. Then the device is conducting to its fullest extent and further increases in grid potential have no effect on the conductivity. This inherent characteristic of such an electron discharge device may be readily utilized to maintain the potential difference across the resistance 1 equal to that generated by the thermocouple 6 so that the current in the output circuit of the electron discharge device is proportional to the potential generated by the thermocouple and, therefore, to the temperature to which the thermocouple is exposed. A feature of my invention lies in the means I have provided for automatically controlling the potential relation between the cathode and the grid of the electron discharge device.

I have shown in Fig. 2, the movable needle 11 of galvanometer 12 provided with a light mirror 26. Angularly disposed from the mirror at a suitable distance is a light source 27, from which light rays, after passing through a lens 28, strike the mirror 26 and are reflected upon photoelectric cells 29 and 30, suitably disposed relative to the source and to the mirror. The cells 29, 30 are provided with cathodes 31, 32 and anodes 33, 34 respectively. The cathode 31 is connected to one side of the secondary 35 of the transformer 23. The other side of the secondary 35 is connected to the cathode 21 of the electron discharge device. The anode 33 of the photocell 29 is connected to the cathode 32 of the photocell 30 by a conductor 36. The anode 34 is connected to a point 37 intermediate the ends of a resistance 38 which is connected across the secondary of the transformer 25. The grid 19 of the device 18 is connected to the conductor 36.

It is well known that the electric resistance of a photoelectric cell varies inversely with the amount of light to which its cathode is subjected. By allowing a majority of the light reflected by the mirror 26 to reach the cathode of the photocell 29, a potential substantially equal to that produced by the secondary 35 of the transformer 23 will be impressed on the grid 19. I purposely construct the secondary 35 and arrange the transformer as a whole so that the potential thereby impressed on the grid is sufficiently negative with respect to the potential of the cathode 21 to render the electron discharge device 18 substantially non-conducting. Likewise I so locate the point 37 in the resistance 38 so that when most or all of the light reflected by the mirror 26 is impressed upon the photocell 30, the potential impressed on the grid 19 is sufficiently positive with respect to that of the cathode 21 as to render the electron discharge device conducting to the fullest extent.

Inasmuch as the mirror 26 is secured to and carried by the movable member 11 of the galvanometer, it will be deflected from a neutral position whenever a difference in potential exists between that produced by the current in the resistance 1 by the measuring circuit and that generated by the thermocouple 6 in the galvanometer circuit. Deflection of the mirror will be effective for controlling the amount of light to which the photocell 29 is subjected relative to that to which the photocell 30 is subjected, so that the electron discharge device will be rendered more or less conducting in accordance with the position of the mirror 26, and correspondingly, with the relation of potential across the resistance 1.

It is evident that as the potential generated by the thermocouple increases, for example, the deflection of the needle 11 will be effective for increasing the amount of light to which the photocell 30 is subjected and decreasing the amount of light to which the photocell 29 is subjected, thereby raising the potential of the grid 19 with respect to the cathode 20 and increasing the current in the resistance 1 until the potential difference across the resistance 1 is substantially equal to the potential generated by the thermocouple. Thereafter there will be no further movement of the deflecting member 11 until there is a further difference in potential. The index or other deflecting element of the current measuring device 2 will, therefore, as in Fig. 1, be deflected in accordance with changes in the temperature and, by proper calibration, may be made to indicate and/or record directly in units of temperature.

It may be found desirable to maintain a low value of current in the output circuit of the electron discharge device, with a relatively high value of potential. In order that I may have ample current available for operating any number of recording, indicating, or other measuring devices, I may, as illustrated, place the measuring devices in the primary circuit of the transformer 25. I have, by way of illustration, shown connected in this primary circuit a current measuring device, such as an ammeter 39, somewhat similar to the ammeter 2, but of more rugged construction, and a recording device, generally indicated at 40. By proper design of a transformer, a relatively large current in the primary circuit may be produced for a given current in the secondary. Inasmuch as the current in the primary circuit will vary with the current in the secondary, it follows that the current to which the devices 39 and 40 are sensitive will be proportional to the temperature surrounding the thermocouple 6, and the devices 39 and 40 may be graduated to read directly in terms of temperature.

The recording device 40 is shown more or less diagrammatically, but is essentially an ammeter comprising a coil 41 having a movable core 42 pivotally suspended from one end of a beam 43 oscillatable about a pivot 44. The beam carries at its other end an indicator movable relative to an index 49 and further comprises a marking pen moved over a recording chart 47, which latter is turned at a uniform speed by a clock mechanism 48. So that motion of the beam may bear a functional relation as described to the current in the coil 41, the beam is provided with a pendulum 50 to create an opposing force substantially proportional to its angle of inclination with the vertical, but other means of providing opposing force may be used if desired. In general, it is to be understood that the device 40 is shown merely by way of illustration.

While in Fig. 2 I have illustrated apparatus wherein a direct-current of constant magnitude, such as is produced by a thermocouple, is opposed by a pulsating direct-current such as is produced by an electron discharge device provided with a source of alternating current, I have found that this in no way interferes with the successful operation of my apparatus and that the average value of current necessary to maintain the movable member of the galvanometer at a predetermined position, and indicated by the measuring devices 2, 39 and 40, is an accurate measure of the potential produced by the thermocouple.

One important advantage of the arrangement illustrated and described is that I may measure and indicate or record the value of very small currents and potentials which ordinarily are of such a minute magnitude that they will not serve to actuate a measuring device. In the arrangement of Fig. 2, I illustrate at A, B terminals where the thermocouple 6 is connected into the circuit. Now in Fig. 4, I show the possibility of connecting to the terminals A, B a direct-current load provided with a shunt between the point of connection A, B, and through which arrangement it is possible for me to measure current in the nature of a millionth of an ampere. Further, in Fig. 5, I show the possibility of connecting across the terminals A, B a direct-current load and arrangement for measuring potentials of minute magnitude such, for example, as of the order of a millionth of a volt. If it were desired to measure currents and potentials of minute nature in alternating current circuits, this could be accomplished, of course, by interposing between the circuit and the terminals A, B known means of rectification.

It is frequently desirable to employ measuring devices to different ranges of values at different periods of time, such, for example, as in connection with a range of 0 to 100° F. at one time and again to a range of 0 to 500° F., etc. It is not desirable to arrange the indicating or recording devices to take care of the greatest possible range, for then when in use with a lower range, only a restricted part of the scale will be in use and the readings will be difficult to observe. It is usually preferable to utilize the whole scale or index range, regardless of the range of values being measured. One feature of my invention is to provide the use of a complete scale or chart range for several different ranges of value, and in this connection, I call attention to Fig. 3.

Fig. 3 shows a portion of the circuit of Fig. 1 wherein the resistance 51 corresponding to the resistance 1 of the other views of the drawing, is provided with a plurality of taps 52, 53 and 54. The lead 9 from the galvanometer 12 in place of joining the resistance at 10, leads to a pivot 55 around which may be positioned a contact arm 56 for desirably engaging the resistance leads 52, 53 or 54. When the contact arm 56 engages the tap 52, the entire resistance 51 is effective for producing a potential difference opposing that generated by the thermocouple, so that a small variation in current will produce a relatively high variation in the potential difference. A wide range in temperature will, therefore, be required to move the indicators of the measuring devices over their entire scales.

With the contact arm 56 in engagement with the tap 54 as shown, only that portion of the resistance 51 between the tap 8 and the tap 54 will be effective for producing a potential difference opposing that generated by the thermocouple. To produce a given change in potential difference will, therefore, require a much greater variation of current in the resistance than was required with the contact arm in engagement with the tap 52. Therefore, the indicators of the measuring devices will move from their initial position to their maximum position for a much smaller range in temperature.

By proper spacing of the taps along the resistance 51, I may make the measuring devices particularly adapted for any series of ranges desired. For example, with the contact arm engaging the tap 52, I may secure maximum deflection of the measuring devices for a range of 1000° F. With the contact arm in engagement with the tap 53, I may obtain maximum deflection for a range of 750° F., or by engagement with the tap 54, I may secure a maximum deflection for a range of 500° F.

While in the above description I have preferred to use specific values, it is to be understood that these values are merely arbitrary ones, and it is not to be inferred that I am limited to the particular values cited. Furthermore, I may space the tapping unequally along the resistance or have any number of taps.

While I have chosen to illustrate and describe an improved measuring apparatus as used to determine temperature, it is to be understood that I am not to be limited thereby and that my invention broadly contemplates any apparatus suitable for determining the magnitude of a condition, or quantity, or variable, and operating under the same or substantially similar principles to those which I have illustrated and described.

While I employ a null or balanced method, I have eliminated mechanical steps between electrical steps, by causing my re-balancing to be done automatically and electrically without the interposing of mechanical actuation. I utilize broadly a fixed impedance or resistance through which is passed a current which may be varied; as compared to known circuits which provide for varying the resistance and holding the current constant. Through my arrangement decided improvement in speed and accuracy of operation is obtained, as well as simplicity of the apparatus, and many novel results resulting therefrom.

Certain features of my invention, disclosed but not claimed herein, form the subject matter of a copending application for Letters Patent of the United States, Serial No. 57,158, filed January 2, 1936.

What I claim as new, and desire to secure by Letters Patent of the United States, is:—

1. In combination, a galvanometer circuit including a galvanometer, a resistance, and a voltage generator; a measuring circuit including said resistance, a source of current, an electronic discharge device, and a current measuring instrument in circuit with the said device; and means controlled by said galvanometer for electrically controlling the effective resistance of said device.

2. The combination with means for producing a potential representative of the value of a condition, means for determining the magnitude of said potential comprising an impedance and a source of current for producing a second potential across said impedance, means for determining the difference between said first and second-named potentials, electron discharge means to control said second named potential to maintain said difference at a predetermined magnitude, and means for measuring the current for producing said second potential across said impedance.

3. The combination with a galvanometer having a movable member, of means for producing a deflection of said member, means including an impedance and a source of current associated with the galvanometer for producing a potential effective for deflecting the member, an electron discharge device having an input circuit and an output circuit, said output circuit including said source of current and said impedance, photoelectric means for regulating the energization of said input circuit, means operated by said movable member for controlling said photo-electric means, an electric circuit comprising a source of current and a current measuring device, and an inductive coupling between said output circuit and said last-named electric circuit.

4. The combination with a galvanometer having a movable member, of means for producing a deflection of said member, an electric circuit including an impedance and a source of current associated with the galvanometer for producing a potential effective for deflecting the member, means actuated by the galvanometer for varying the current in the electric circuit, a second electric circuit for determining the magnitude of the current in the first electric circuit comprising a source of current, a current sensitive measuring device; and an inductive coupling between said first and second named electric circuits.

5. In combination, a galvanometer circuit including a galvanometer, a resistance, and a source of electrical potential; and means including electron discharge means for varying the potential drop across said resistance for balancing the galvanometer while maintaining fixed the value of said resistance included in said galvanometer circuit.

6. An apparatus for measuring variations in a physical magnitude comprising a measuring circuit connected across a source of current and including an impedance, a sensitive circuit subjected to a voltage derived from the voltage drop along said impedance and including a voltage sensitive device, means whereby said voltage-sensitive device is subjected to voltage variations in accordance with variations in the physical magnitude to be measured, electron discharge means for varying the flow of current in said measuring circuit in such a sense as to tend to neutralize such voltage variations, and means for measuring the current in the measuring circuit, said current being proportional to said variable to be measured.

7. Device responsive to a small voltage source comprising, a bridge having as adjacent balancing arms the space paths, respectively, of a pair of space discharge devices, and as a conjugate arm the grid circuit of a space discharge device having an anode, a cathode, and a grid electrode, a balancing circuit traversed by the space current of said device last mentioned, said circuit comprising a resistance shunting said small voltage source, high-frequency means controlling the space path resistances of said discharge devices, means responsive to a flow of unbalanced current in said circuit for oppositely varying said balancing arm space path resistances, automatically to maintain a condition of electrical equilibrium in said balancing circuit, and translating means indicative of the condition of equilibrium.

8. Device responsive to a small voltage source comprising, a bridge having as adjacent balancing arms the space paths, respectively, of a first and a second space discharge device, and as a conjugate arm the grid circuit of a third space discharge device having an anode, a cathode, and a control grid, a balancing circuit traversed by the space current of said third device, said circuit comprising a resistance in shunt to said small voltage source, high-frequency means controlling the space path resistances of said first and second devices, means responsive to unbalanced current flow in said balancing circuit for oppositely varying the space path resistances of said first and second devices, automatically to maintain in said balancing circuit a condition of electrical equilibrium, and translating means responsive to space current of said third space discharge device.

9. A device responsive to a small voltage source comprising, a bridge having as adjacent balancing arms the space paths, respectively, of a pair of space discharge devices, and as a conjugate arm the grid circuit of a space discharge device having an anode, a cathode, and a grid electrode, a balancing circuit traversed by the space current of said device last mentioned, said circuit comprising a resistance shunting said small voltage source, means responsive to a flow of unbalanced current in said circuit for oppositely varying said balancing arm space path resistances, automatically to maintain a condition of electrical equilibrium in said balancing circuit, and translating means indicative of the condition of equilibrium.

10. A device responsive to a small voltage source comprising, a bridge having as adjacent balancing arms the space paths, respectively, of a first and a second space discharge device, and as a conjugate arm the grid circuit of a third space discharge device having an anode, a cathode, and a control grid, a balancing circuit traversed by the space current of said third device, said circuit comprising a resistance in shunt to said small voltage source, means responsive to unbalanced current flow in said balancing circuit for oppositely varying the space path resistances of said first and second devices, automatically to maintain in said balancing circuit a condition of electrical equilibrium, and translating means responsive to space current of said third space discharge device.

11. Device responsive to a small voltage source comprising, a bridge having as adjacent balancing arms the space paths, respectively, of a pair of light sensitive space discharge devices, and as a conjugate arm the grid circuit of a space discharge device having an anode, a cathode, and a grid electrode, a balancing circuit traversed by the space current of said device last mentioned, said circuit comprising a resistance shunting said small voltage source, means including a source of light for controlling the space path resistances of said discharge devices, means responsive to a flow of unbalanced current in said circuit for oppositely varying said balancing arm space path resistances, automatically, to maintain a condition of electrical equilibrium in said balancing circuit, and translating means indicative of the condition of equilibrium.

12. Device responsive to a small voltage source comprising, a bridge having as adjacent balancing arms the space paths, respectively, of a pair of light sensitive space discharge devices, and as a conjugate arm the grid circuit of a space discharge device having an anode, a cathode, and a grid electrode, a balancing circuit traversed by the space current of said device last mentioned, said circuit comprising a resistance shunting said small voltage source, a light source, means for directing rays of light from said source upon said light sensitive devices for controlling the space path resistances of said light sensitive devices, means responsive to a flow of unbalanced current in said circuit for relatively varying the amount of light from said source falling upon said light sensitive devices for oppositely varying said balancing arm space path resistances, automatically to maintain a condition of electrical equilibrium in said balancing circuit, and translating means indicative of the condition of equilibrium.

13. Device responsive to a small voltage source comprising, a bridge having as adjacent balancing arms the space paths, respectively, of a pair of light sensitive space discharge devices, and as a conjugate arm the grid circuit of a space discharge device having an anode, a cathode, and a grid electrode, a balancing circuit traversed by the space current of said device last mentioned, said circuit comprising a resistance shunting said small voltage source, means responsive to a flow of unbalanced current in said circuit for relatively varying the amount of light falling upon said light sensitive space discharge devices for oppositely varying said balancing arm space path resistances, automatically to maintain a condition of electrical equilibrium in said balancing circuit, and translating means indicative of the condition of equilibrium.

14. Device responsive to a small voltage source comprising, a bridge having adjacent balancing arms including the internal resistances, respectively, of a first and a second light sensitive device, and as a conjugate arm the grid circuit of a space discharge device having an anode, a cathode, and a control grid, a balancing circuit traversed by the space current of said space discharge device, said circuit comprising a resistance in shunt to said small voltage source, a source of light controlling the internal resistances of said light sensitive devices, means responsive to unbalanced current flow in said balancing circuit for relatively varying the amount of light falling on the respective light sensitive devices for oppositely varying the resistances of said light sensitive devices, automatically to maintain in said balancing circuit a condition of electrical equilibrium, and translating means responsive to space current of said space discharge device.

JOHN D. RYDER.